(12) United States Patent
Shibata et al.

(10) Patent No.: US 12,121,903 B2
(45) Date of Patent: Oct. 22, 2024

(54) SLAG CRUSHER, GASIFIER, INTEGRATED GASIFICATION COMBINED CYCLE, AND ASSEMBLY METHOD OF SLAG CRUSHER

(71) Applicant: Mitsubishi Power, Ltd., Yokohama (JP)

(72) Inventors: Kengo Shibata, Kanagawa (JP); Makoto Toyomaru, Kanagawa (JP); Masashi Kitada, Kanagawa (JP)

(73) Assignee: MITSUBISHI HEAVY INDUSTRIES, LTD., Tokyo (JP)

( * ) Notice: Subject to any disclaimer, the term of this patent is extended or adjusted under 35 U.S.C. 154(b) by 358 days.

(21) Appl. No.: 17/269,632

(22) PCT Filed: Dec. 17, 2019

(86) PCT No.: PCT/JP2019/049281
§ 371 (c)(1),
(2) Date: Feb. 19, 2021

(87) PCT Pub. No.: WO2020/129934
PCT Pub. Date: Jun. 25, 2020

(65) Prior Publication Data
US 2021/0339260 A1    Nov. 4, 2021

(30) Foreign Application Priority Data

Dec. 21, 2018 (JP) ................... 2018-239672

(51) Int. Cl.
*B02C 1/00* (2006.01)
*B02C 23/16* (2006.01)
(Continued)

(52) U.S. Cl.
CPC .............. *B02C 1/005* (2013.01); *B02C 23/16* (2013.01); *B07B 1/469* (2013.01); *C10J 3/485* (2013.01);
(Continued)

(58) Field of Classification Search
CPC ........... B02C 1/005; B02C 1/06; B02C 23/16; C10J 3/526; C10J 3/485; C10J 2300/093; C10J 2300/1628; B07B 1/469
See application file for complete search history.

(56) References Cited

U.S. PATENT DOCUMENTS

2002/0125351 A1*  9/2002  Okuya ................... B02C 1/005
                                                        241/3
2014/0234021 A1    8/2014  Frangenberg
(Continued)

FOREIGN PATENT DOCUMENTS

CN        201823424 U  *  5/2011
CN        103480301 A     1/2014
(Continued)

OTHER PUBLICATIONS

English translate (JP2018132141A), retrieved date Aug. 8, 2023.*
(Continued)

*Primary Examiner* — Mohammed S. Alawadi
(74) *Attorney, Agent, or Firm* — WHDA, LLP (57) ABSTRACT

Provided are a slag crusher, a gasifier, an integrated gasification combined cycle, and an assembly method of a slag crusher that can ensure the strength of a guide rod. The slag crusher includes: a porous member screen; a spreader that is reciprocated in a predetermined direction along a top surface of the screen and crushes the slag accumulated on the screen; and a guide rod having an axis line along the predetermined direction, is connected to the spreader, and restricts a moving direction of the spreader, the guide rod has a spreader-side member connected to the spreader and a shaft member connected to the spreader-side member, the spreader-side member and the shaft member are connected by butt welding in the axis line direction, and the spreader-side member and the shaft member have the same shape of cross sections (Continued)

orthogonal to the axis line direction at a butt welding position.

7 Claims, 9 Drawing Sheets

(51) Int. Cl.
   *B07B 1/46* (2006.01)
   *C10J 3/48* (2006.01)
   *C10J 3/52* (2006.01)
(52) U.S. Cl.
   CPC ......... *C10J 3/526* (2013.01); *B02C 2023/165* (2013.01); *C10J 2300/093* (2013.01); *C10J 2300/1628* (2013.01)

(56) References Cited

U.S. PATENT DOCUMENTS

| | | | |
|---|---|---|---|
| 2016/0257895 | A1 | 9/2016 | Soda et al. |
| 2017/0342337 | A1 | 11/2017 | Miyata et al. |
| 2019/0030543 | A1 | 1/2019 | Ohashi et al. |

FOREIGN PATENT DOCUMENTS

| | | | | |
|---|---|---|---|---|
| CN | 204417618 U | | 6/2015 | |
| CN | 204509227 U | | 7/2015 | |
| CN | 104912145 A | | 9/2015 | |
| CN | 107052030 A | | 8/2017 | |
| CN | 107213947 A | | 9/2017 | |
| CN | 206838270 U | | 1/2018 | |
| CN | 108405038 A | * | 8/2018 | ............ B02C 1/005 |
| CN | 108883418 A | | 11/2018 | |
| JP | 52-055053 A | | 5/1977 | |
| JP | 52-103756 A | | 8/1977 | |
| JP | 3276269 B2 | | 4/2002 | |
| JP | 2015-059340 A | | 3/2015 | |
| JP | 2015-117373 A | | 6/2015 | |
| JP | 2018132141 A | * | 8/2018 | |
| WO | 2011/104903 A1 | | 9/2011 | |
| WO | 2017/149807 A1 | | 9/2017 | |

OTHER PUBLICATIONS

English translate (CN201823424U), retrieved date Aug. 8, 2023.*
English translate (CN108405038A), retrieved date Aug. 9, 2023.*
Office Action dated Nov. 22, 2021, issued in counterpart CN application No. 201980055432.3, with English translation. (20 pages).
International Search Report dated Mar. 17, 2020, issued in counterpart application No. PCT/JP2019/049281, w/English translation (5 pages).

* cited by examiner

SLAG CRUSHER, GASIFIER, INTEGRATED GASIFICATION COMBINED CYCLE, AND ASSEMBLY METHOD OF SLAG CRUSHER

TECHNICAL FIELD

The present invention relates to a slag crusher, a gasifier, an integrated gasification combined cycle, and an assembly method of a slag crusher.

BACKGROUND ART

Conventionally, carbonaceous fuel gasification units (coal gasification units) that generate a flammable gas by feeding carbonaceous feedstock such as coal to a gasifier and partially combusting and thereby gasifying the carbonaceous feedstock are known as gasifier units.

In general, an integrated coal gasification combined cycle (hereafter, referred to as "IGCC") is formed including a coal feeding unit, a coal gasifier, a char recovery device (a cyclone, a porous filter, or the like), a gas clean-up unit, a gas turbine, a steam turbine, a generator, a heat recovery steam generator, a gasification agent feed device, or the like.

In such an integrated coal gasification combined cycle, coal (pulverized coal) is feeded from a coal feed unit to a coal gasifier, and a gasification agent (air, oxygen rich air, oxygen, water vapor, or the like) is feeded from a gasification agent feed device.

Inside the coal gasifier, coal is partially oxidized and gasified with the gasification agent, and a combustible gas (coal gas) is generated.

For example, as disclosed in Patent Literature 1, pulverized coal is combusted at a high temperature in a combustor section, thereby a coal gas that is a combustible gas is generated, and the ash component in the pulverized coal is melted and drops, and a slag bath that collects the dropping slag (melted slag) is provided in perpendicularly below of a coal gasifier.

Slag water (cooling water) is stored in a slag bath, slag drops in the slag water and is rapidly cooled and thereby solidified, and the solid slag is then crushed. That is, a slag crusher that crushes slag, which has dropped from the combustor section, by using a spreader is provided perpendicularly below the slag bath.

Slag that has dropped from a combustor is rapidly cooled and solidified in the cooling water stored in the slag bath and drops onto the perpendicularly upper surface of a screen provided to the slag crusher. This screen has a plurality of openings, slag that is smaller than the diameter of each opening passes through the opening and drops perpendicularly below, and slag that is larger than the diameter of each opening remains on the perpendicularly upper surface of the screen.

The spreaders are driven to reciprocate along the perpendicularly upper surface of the screen by a hydraulic cylinder, for example. The spreaders crush slag accumulated on the perpendicularly upper surface of the screen, and slag crushed into pieces that are smaller than the diameter of the opening in the screen drops through the opening in the screen. Slag that has dropped through the opening in the screen is discharged out of the system from the gasifier via a rock hopper.

When slag is crushed by spreaders, due to insertion of slag, aged deterioration of the spreaders, or the like, a shift may occur in the track along which the spreaders are reciprocated. Accordingly, as disclosed in Patent Literature 2, a support rod may be connected to a spreader to guide the spreader in a reciprocating direction.

CITATION LIST

Patent Literature

{PTL 1}
Japanese Patent Application Laid-Open No. 2018-132141
{PTL 2}
Japanese Patent No. 3276269

SUMMARY OF INVENTION

Technical Problem

Figure 12:
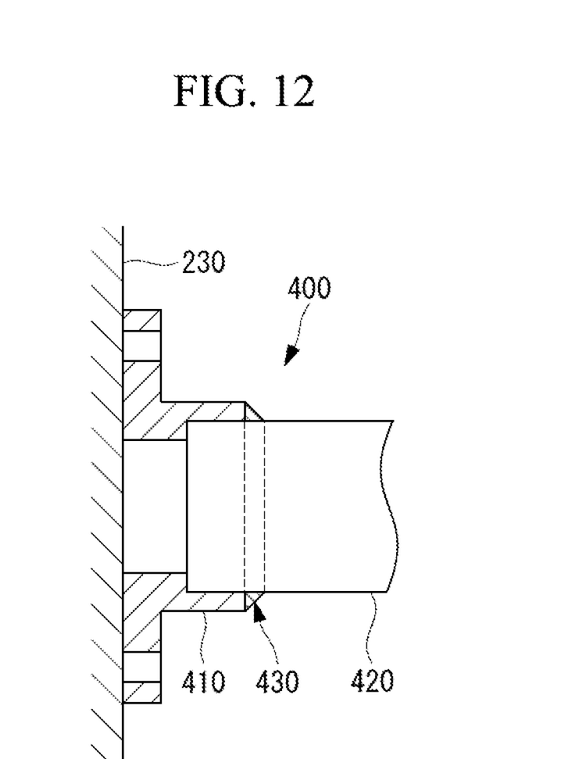
FIG. 12 is a partial vertical sectional view according to a conventional example of a guide rod.

As illustrated in FIG. 12, a connection between a support rod (guide rod) 400 and a spreader 230 as described previously may be structured to fix a flange member 410 connected to the spreader 230 and a solid cylinder 420 to each other by socket welding, for example. A connection may be structured to insert the solid cylinder 420 in the flange member 410 and apply fillet welding around the connection portion to fix the solid cylinder 420. In the welding of both the cases, since a stress concentrates at a welding portion 430 where the shape is discontinuous (for example, a step portion occurring due to a difference between outer diameters of the flange portion and the solid cylinder portion), it is required to ensure a sufficient strength of the welding portion 430, and this may result in a thick shape and thus an increase in size.

The present invention has been made in view of such circumstances and intends to provide a slag crusher, a gasifier, an integrated gasification combined cycle, and an assembly method of a slag crusher that can ensure the strength of a guide rod.

Solution to Problem

To solve the problem described above, a slag crusher, a gasifier, an integrated gasification combined cycle, and an assembly method of a slag crusher according to the present invention employ the following solutions.

That is, a slag crusher according to one aspect of the present invention is a slag crusher that crushes slag generated by a combustor of a gasifier that gasifies carbonaceous feedstock and solidified in cooling water stored in a slag bath installed perpendicularly below the combustor, and the slag crusher includes: a screen of a porous member provided so as to cross a drop direction of the slag and formed with a plurality of openings; a spreader that is reciprocated in a predetermined direction along a top surface on a perpendicularly upper side of the screen and crushes the slag accumulated on the screen; and a guide rod that is a bar-like member having an axis line along the predetermined direction, is connected to the spreader, and restricts a moving direction of the spreader. The guide rod has a spreader-side member connected to the spreader and a shaft member connected to the spreader-side member, the spreader-side member and the shaft member are connected by butt welding in the axis line direction, and the spreader-side member and the shaft member have the same shape of cross sections orthogonal to the axis line direction at a butt welding position.

In the slag crusher according to the present aspect, the guide rod has a spreader-side member connected to the spreader and a shaft member connected to the spreader-side member, and the spreader-side member and the shaft member are connected to each other by butt welding in the axis line direction of the guide rod. In this case, at the butt welding position, the spreader-side member and the shaft member have the same shape of cross sections orthogonal to the axis line direction. Accordingly, for example, since the spreader-side member and the shaft member having substantially the same outer diameter are butted against each other and welded, a discontinuous shape portion (for example, a step portion caused by a difference in outer diameters) does not occur at the connection portion between the spreader-side member and the shaft member, and this can suppress a stress from concentrating in the connection portion. By providing a groove (for example, a V-shape groove or an X-shape groove) in the butt portion, it is possible to ensure a weld leg length of butt welding to improve the welding strength.

In the slag crusher according to one aspect of the present invention, the spreader-side member has a spreader-side hollow portion formed along the axis line direction, and the shaft member has a shaft-side hollow portion that is a part of the shaft member located on a connection portion side to the spreader-side member and formed along the axis line direction.

In the guide rod provided in the slag crusher according to the present aspect, the spreader-side hollow portion penetrated through and shaped in a hollow along the axis line direction is formed in the spreader-side member, and the axis-side hollow portion, which is a part of the shaft member hollowed from a connection portion side to the spreader-side member along the axis line direction, is formed in the shaft member. In this case, at the butt welding position, the spreader-side member and the shaft member have the same shape of cross sections orthogonal to the axis line direction. This enables a reduction in weight of the spreader-side member and the shaft member compared to a case where the spreader-side member and the shaft member are solid.

Since the guide rod has flexible structure due to the hollow structure, it is possible to suppress a stress from concentrating in the connection portion between the spreader-side member and the spreader.

In the butt welding, by controlling the thicknesses of the spreader-side member and the shaft member to be the same at the butt position, it is possible to reliably perform penetration joint of the welding to improve the welding strength.

In the slag crusher according to one aspect of the present invention, in the shaft member, the boundary between the shaft-side hollow portion and a solid portion adjacent to the shaft-side hollow portion is shaped in a smooth curve.

In the shaft member of the guide rod provided to the slag crusher according to the present aspect, the boundary between the shaft-side hollow portion formed in the shaft member and the solid portion adjacent to the shaft-side hollow portion is shaped in a smooth curve. This can suppress a stress from concentrating at the boundary between the shaft-side hollow portion and the solid portion. It is therefore possible to relieve concentration of a stress to improve the strength of the guide rod at the boundary between the shaft-side hollow portion and the solid portion.

In the slag crusher according to one aspect of the present invention, the spreader-side member has a spreader-side hollow portion formed along the axis line direction, and the shaft member has a shaft-side hollow portion formed along the axis line direction.

In the guide rod provided to the slag crusher according to the present aspect, a spreader-side hollow portion penetrated through and hollowed along the axis line direction is formed in the spreader-side member, and an axis-side hollow portion penetrated through and hollowed along the axis line direction is formed in the shaft member. This enables a reduction in weight of the spreader side member and a further reduction in weight of the shaft member compared to a case where the spreader-side member and a part of the shaft member are hollowed.

Since the guide rod has the structure entirely hollowed along the axis line direction and thus has flexible structure, it is possible to suppress a stress from concentrating in the connection portion between the spreader-side member and the spreader to improve the strength of the guide rod.

The slag crusher according to one aspect of the present invention has a drive mechanism connected to the spreader and configured to reciprocate the spreader in the predetermined direction, and the guide rod includes at least four guide rods, the connection positions of the guide rods to the spreader when viewed from the predetermined direction are located in a circumferentially symmetrical manner with respect to the connection position of the drive mechanism to the spreader.

In the slag crusher according to the present aspect, the connection positions of the guide rods to the spreader when viewed from a predetermined direction are located in a circumferentially symmetrical manner with respect to the connection position of the drive mechanism to the spreader. This enables the guide rod to efficiently receive an offset load generated by fluctuations occurring during reciprocation of the spreader. Thus, the reciprocating movement of the spreader can be stabilized.

The slag crusher according to one aspect of the present invention has a casing in which a through hole in which the guide rod is slidably supported is formed.

The slag crusher according to the present aspect has a casing in which a through hole in which the guide rod is slidably supported is formed. Accordingly, the reciprocating movement of the guide rod that restricts the moving direction of the spreader can be stabilized. In this case, the through hole may be formed of a bearing member made of a copper-based material (for example, CAC403 or the like), for example.

A gasifier according to one aspect of the present invention has the slag crusher described above.

An integrated gasification combined cycle according to one aspect of the present invention has: the gasifier described above; a gas turbine rotated and driven by at least partial combustion of a raw syngas generated by the gasifier; a steam turbine rotated and driven by steam generated by a heat recovery steam generator that introduces a turbine flue gas discharged from the gas turbine; and a generator coupled to and rotated by the gas turbine and/or the steam turbine.

An assembly method of a slag crusher according to one aspect of the present invention is an assembly method of a slag crusher that, by using a spreader reciprocated in a predetermined direction, crushes slag generated by a combustor of a gasifier that gasifies carbonaceous feedstock and solidified in cooling water stored in a slag bath installed perpendicularly below the combustor, and the assembly method includes a step of: at a guide rod that is a bar-like member having an axis line along the predetermined direction, has a spreader-side member connected to the spreader and a shaft member connected to the spreader-side member, and restricts a moving direction of the spreader, performing butt welding in the axis line direction on the spreader-side member and the shaft member at a portion where the spreader-side member and the shaft member have the same shape of cross sections orthogonal to the axis line direction.

Advantageous Effects of Invention

According to the slag crusher, the gasifier, the integrated gasification combined cycle, and the assembly method of the slag crusher of the present invention, the strength of the guide rod can be ensured.

DESCRIPTION OF EMBODIMENTS

A slag crusher, a gasifier, an integrated gasification combined cycle, and an assembly method of a slag crusher according to one embodiment of the present invention will be described below with reference to the drawings.
{Integrated Coal Gasification Combined Cycle}

Figure 1:
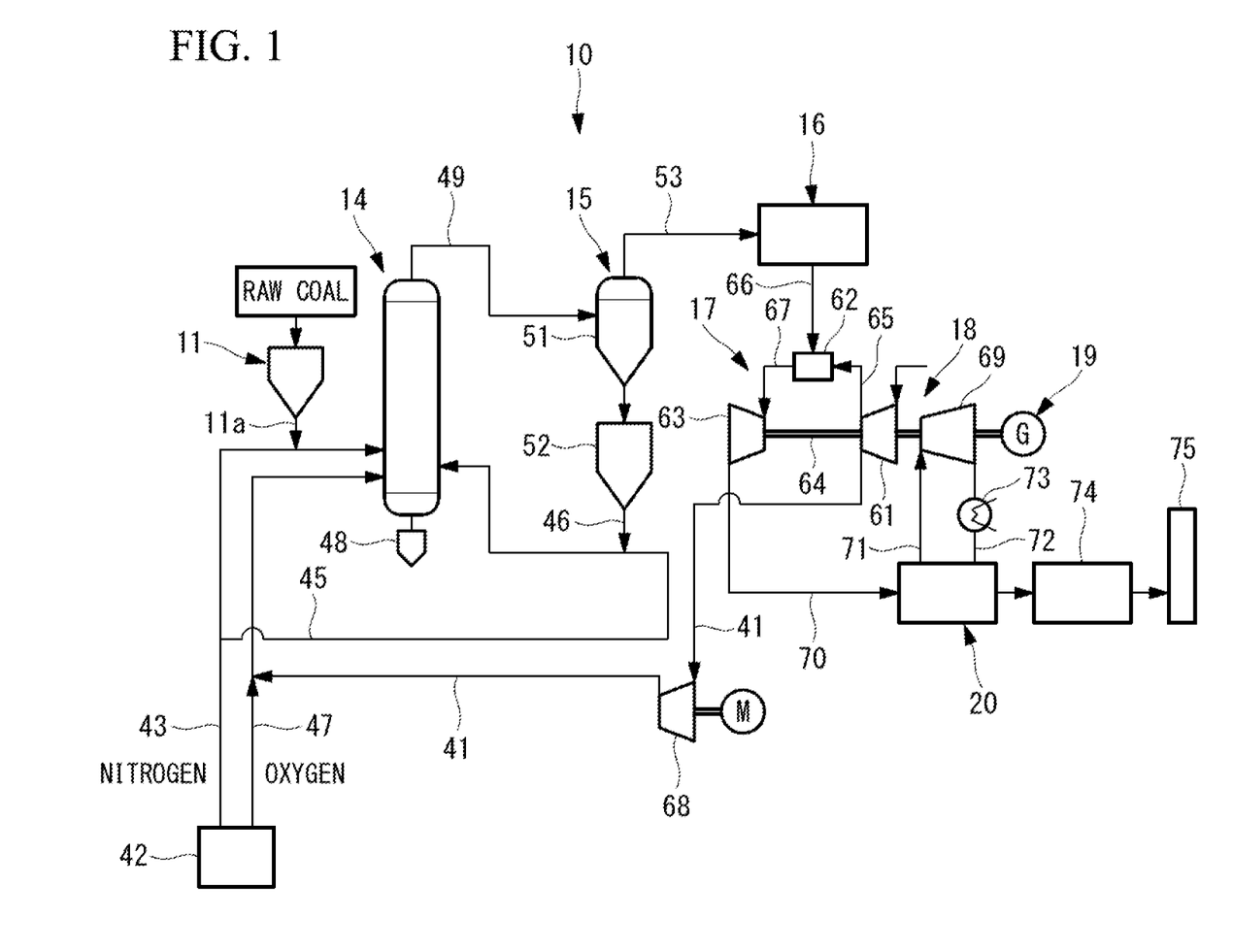
FIG. 1 is a schematic configuration diagram illustrating an integrated coal gasification combined cycle.

FIG. 1 is a diagram illustrating a general configuration example of an integrated coal gasification combined cycle having a gasifier unit to which the slag crusher according to one embodiment of the present invention is applied.

An integrated coal gasification combined cycle (IGCC) 10 to which a gasifier unit 14 is applied uses air as an oxygen containing gas and employs an air combustion system to generate a flammable gas (raw syngas) from fuel in the gasifier unit 14. Further, the integrated coal gasification combined cycle 10 generates power by purifying a raw syngas, which is generated by the gasifier unit 14, by using a gas clean-up unit 16 to produce a fuel gas and then feeding the fuel gas to a gas turbine 17. That is, the integrated coal gasification combined cycle 10 of the first embodiment is a power unit of an air combustion system (air blow). As a fuel feeded to the gasifier unit 14, carbonaceous feedstock such as coal is used, for example.

As illustrated in FIG. 1, the integrated coal gasification combined cycle (integrated gasification combined cycle) 10 has a coal feeding unit 11, the gasifier unit 14, a char recovery unit 15, the gas clean-up unit 16, the gas turbine 17, a steam turbine 18, a generator 19, and a heat recovery steam generator (HRSG) 20.

The coal feeding unit 11 is feeded with coal that is carbonaceous feedstock as raw coal and produces pulverized coal pulverized into fine particles by pulverizing the coal by using a coal pulverizer (not illustrated) or the like. The pulverized coal produced by the coal feeding unit 11 is pressurized by a nitrogen gas as a carrier inert gas feeded from an air separation unit (ASU) 42 described later at the outlet of a coal feed line 11a, and the pressurized coal is feeded to the gasifier unit 14. The inert gas refers to an inert gas having an oxygen content of around 5% by volume or less and is represented by a nitrogen gas, a carbon dioxide gas, an argon gas, or the like but not necessarily limited to around 5% by volume or less.

The pulverized coal produced by the coal feeding unit 11 is feeded to the gasifier unit 14, and char (unreacted contents and ash contents of coal) recovered by the char recovery unit 15 is returned and feeded to the gasifier unit 14 in a reusable manner.

A compressed air feed line 41 from the gas turbine 17 (compressor 61) is connected to the gasifier unit 14, and the gas pressure of a part of a compressed air compressed by the gas turbine 17 can be boosted to a predetermined pressure by a gas booster 68 and feeded to a gasifier unit 14. The air separation unit 42 separates and generates nitrogen and oxygen from atmospheric air, and the air separation unit 42 and the gasifier unit 14 are connected to each other via a first nitrogen feed line 43. Further, the coal feed line 11a from the coal feeding unit 11 is connected to the first nitrogen feed line 43. A second nitrogen feed line 45 branched from the first nitrogen feed line 43 is also connected to the gasifier unit 14, and a char return line 46 from the char recovery unit 15 is connected to the second nitrogen feed line 45. Furthermore, the air separation unit 42 is connected to the compressed air feed line 41 via an oxygen feed line 47. Further, nitrogen separated by the air separation unit 42 flows through the first nitrogen feed line 43 and the second nitrogen feed line 45 and thereby is used as a carrier gas for coal or char. Oxygen separated by the air separation unit 42 flows through the oxygen feed line 47 and the compressed air feed line 41 and thereby is used as an oxygen containing gas in the gasifier unit 14.

Figure 2:
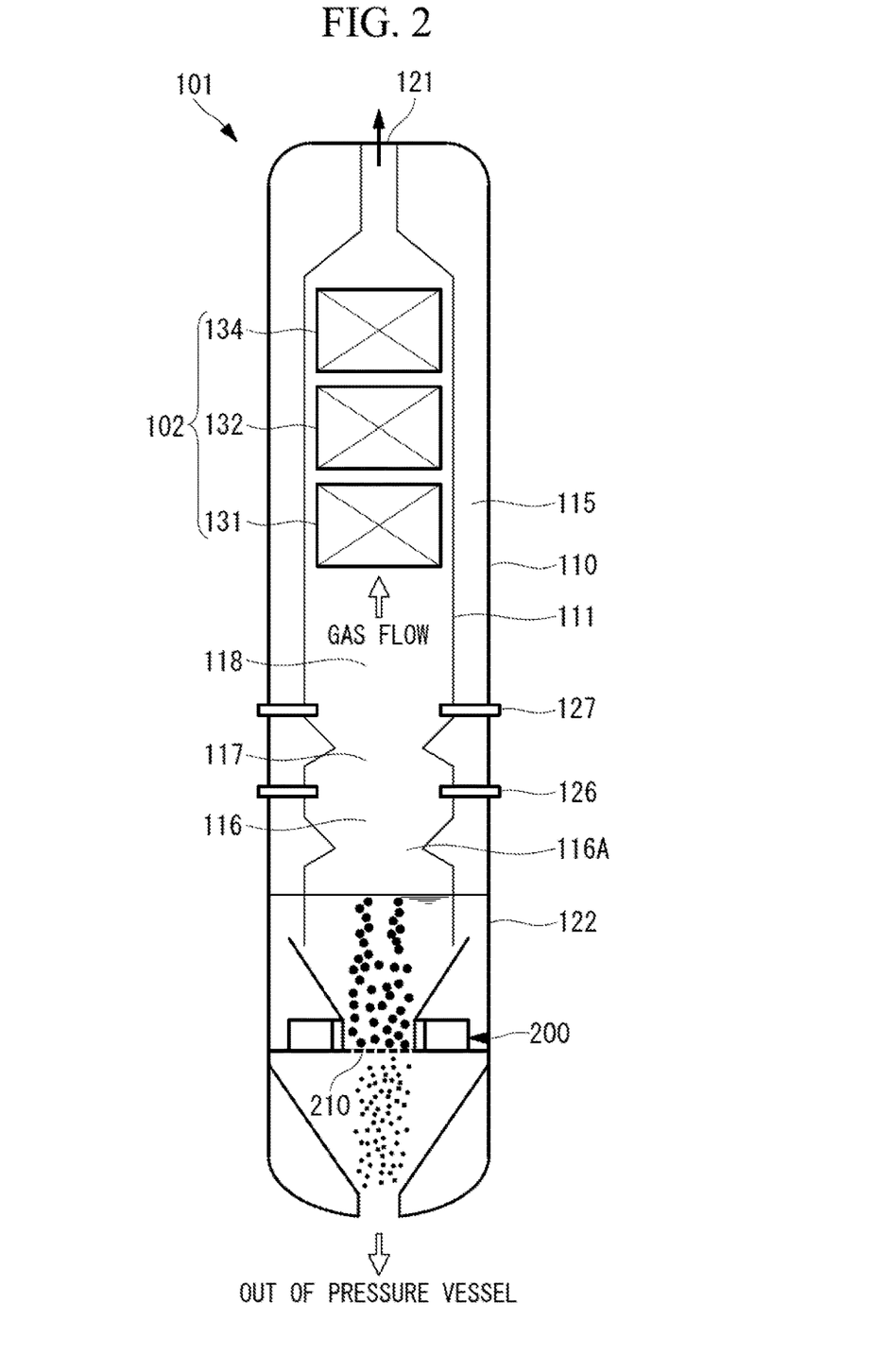
FIG. 2 is a schematic configuration diagram illustrating a gasifier unit of FIG. 1.

The gasifier unit 14 has a gasifier 101 in a form of a two-step entrained bed (see FIG. 2), for example. The gasifier unit 14 produces a raw syngas by partially combusting and thereby gasifying coal (pulverized coal) and char feeded therein with an oxygen containing gas (air, oxygen). A foreign material removal unit 48 that removes a foreign material (slag) mixed in pulverized coal is provided to the gasifier unit 14. Further, a raw syngas line 49 that feedes a raw syngas to the char recovery unit 15 is connected to the gasifier unit 14, and a raw syngas containing char can be discharged. In such a case, as illustrated in FIG. 2, a syngas cooler 102 (gas cooler) may be provided to the raw syngas line 49 to feed a raw syngas to the char recovery unit 15 after cooling to a predetermined temperature.

The char recovery unit 15 has a dust collecting unit 51 and a feed hopper 52. In such a case, the dust collecting unit 51 is formed of one or a plurality of cyclones or porous filters and can separate char contained in the raw syngas generated by the gasifier unit 14. The raw syngas from which char has been separated is then fed to the gas clean-up unit 16 through a gas discharge line 53. The feed hopper 52 stores char separated from the raw syngas by the dust collecting unit 51. A bin may be arranged between the dust collecting unit 51 and the feed hopper 52, and a plurality of feed hoppers 52 may be connected to the bin. Further, the char return line 46 from the feed hopper 52 is connected to the second nitrogen feed line 45.

The gas clean-up unit 16 removes impurities such as a sulfur compound or a nitrogen compound to perform gas purificating on the raw syngas from which char has been separated by the char recovery unit 15. The gas clean-up unit 16 then purifies a raw syngas to produce a fuel gas and feeds this fuel gas to the gas turbine 17. Since a sulfur component (such as H2S) is still contained in the raw syngas from which char has been separated, the sulfur component is removed and recovered by using an amine absorption liquid or the like and effectively used in the gas clean-up unit 16.

The gas turbine 17 has a compressor 61, a combustor 62, and a turbine 63, and the compressor 61 and the turbine 63 are coupled by a rotary shaft 64. A compressed air feed line 65 from the compressor 61, a fuel gas feed line 66 from the gas clean-up unit 16, and a combustion gas feed line 67 extending to the turbine 63 are connected to the combustor 62. The compressed air feed line 41 extending from the compressor 61 to the gasifier unit 14 is provided to the gas turbine 17, and a gas booster 68 is provided in a middle part. Therefore, in the combustor 62, a part of the compressed air feeded from the compressor 61 and at least a part of the fuel gas feeded from the gas clean-up unit 16 are mixed and combusted to generate a combustion gas, and the generated combustion gas is feeded to the turbine 63. The turbine 63 then rotates and drives the generator 19 by rotating and driving the rotary shaft 64 by using the feeded combustion gas.

The steam turbine 18 has a turbine 69 coupled to the rotary shaft 64 of the gas turbine 17, and the generator 19 is coupled to the base end of the rotary shaft 64. The heat recovery steam generator 20 is connected to a flue gas line 70 from the gas turbine 17 (turbine 63) and generates steam by exchanging heat between feedwater and a flue gas from the turbine 63. Further, a steam feed line 71 and a steam recovery line 72 are provided between the heat recovery steam generator 20 and the turbine 69 of the steam turbine 18, and a condenser 73 is provided to the steam recovery line 72. The steam generated by the heat recovery steam generator 20 may include steam generated through heat exchange with the raw syngas by a syngas cooler 102 of the gasifier 101. Therefore, in the steam turbine 18, the turbine 69 is rotated and driven by the steam feeded from the heat recovery steam generator 20, the rotary shaft 64 is rotated in response, and thereby the generator 19 is rotated and driven.

Further, a gas purificating unit 74 is provided between the outlet of the heat recovery steam generator 20 and a stack 75.

The operation of the integrated coal gasification combined cycle 10 will now be described.

In the integrated coal gasification combined cycle 10, once raw coal (coal) is feeded to the coal feeding unit 11, the coal is changed to pulverized coal by being pulverized into fine particles in the coal feeding unit 11. The pulverized coal produced by the coal feeding unit 11 flows through the first nitrogen feed line 43 with nitrogen feeded from the air separation unit 42 and is feeded to the gasifier unit 14. Char recovered by the char recovery unit 15 described later flows through the second nitrogen feed line 45 with nitrogen feeded from the air separation unit 42 and is feeded to the gasifier unit 14. Furthermore, after the gas pressure of a compressed air extracted from the gas turbine 17 described later is boosted by the gas booster 68, the boosted compressed air is feeded to the gasifier unit 14 through the compressed air feed line 41 together with oxygen feeded from the air separation unit 42.

In the gasifier unit 14, the feeded pulverized coal and char are combusted with the compressed air (oxygen), the pulverized coal and char are gasified, and thereby a raw syngas is generated. This raw syngas is then discharged from the gasifier unit 14 through the raw syngas line 49 and fed to the char recovery unit 15.

In the char recovery unit 15, first, the raw syngas is feeded to the dust collecting unit 51, and thereby pulverized char contained in the raw syngas is separated. The raw syngas from which char has been separated is then fed to the gas clean-up unit 16 through the gas discharge line 53. On the other hand, the pulverized char separated from the raw syngas is accumulated in the feed hopper 52, returned to the gasifier unit 14 through the char return line 46, and recycled.

The raw syngas from which char has been separated by the char recovery unit 15 is subjected to gas purification in which impurities such as a sulfur compound or a nitrogen compound are removed, and a fuel gas is produced in the gas clean-up unit 16. The compressor 61 generates and feeds a compressed air to the combustor 62. The combustor 62 generates a combustion gas by mixing and combusting the compressed air feeded from the compressor 61 and the fuel gas feeded from the gas clean-up unit 16. The turbine 63 is rotated and driven by this combustion gas, and thereby the compressor 61 and the generator 19 are rotated and driven via the rotary shaft 64. In such a way, the gas turbine 17 can generate power.

The heat recovery steam generator 20 then generates steam by exchanging heat between feedwater and a flue gas discharged from the turbine 63 in the gas turbine 17 and feeds this generated steam to the steam turbine 18. In the steam turbine 18, it is possible to generate power by using the steam feeded from the heat recovery steam generator 20 to rotate and drive the turbine 69 and thereby rotate and drive the generator 19 via the rotary shaft 64.

The gas turbine 17 and the steam turbine 18 may have different shafts to rotate and drive a plurality of generators instead of sharing the same shaft to rotate and drive the single generator 19.

Then, in the gas purificating unit 74, hazardous substances in the exhaust gas discharged from the heat recovery steam generator 20 are removed, and the purified exhaust gas is emitted from the stack 75 to the atmospheric air.

{Integrated Coal Gasification Combined Cycle}

Next, the gasifier unit 14 in the integrated coal gasification combined cycle 10 described above will be described in detail. FIG. 2 is a schematic configuration diagram illustrating the gasifier unit of FIG. 1.

As illustrated in FIG. 2, the gasifier unit 14 has a gasifier 101 and a syngas cooler 102.

The gasifier 101 is formed extending in the perpendicular direction, pulverized coal and oxygen are feeded on the lower side in the perpendicular direction, and a partially combusted and gasified raw syngas flows through from the lower side to the upper side in the perpendicular direction. The gasifier 101 has a pressure vessel 110 and a gasifier wall (furnace wall) 111 provided inside the pressure vessel 110. Further, the gasifier 101 forms an annulus section 115 in the space between the pressure vessel 110 and the gasifier wall 111. The gasifier 101 forms a combustor section 116, a diffuser section 117, and a reductor section 118 in this order from the lower side in the perpendicular direction (that is, the upstream side in the flow direction of the raw syngas) in the space inside the gasifier wall 111.

The pressure vessel 110 is formed in a cylindrical shape having an internal hollow space, and a gas discharge port 121 is formed at the upper end, while a slag bath 122 is formed at the lower end (bottom). The gasifier wall 111 is formed in a cylindrical shape having an internal hollow space, and the wall surface thereof is provided facing the inner surface of the pressure vessel 110. The pressure vessel 110 has a cylindrical shape, and the diffuser section 117 of the gasifier wall 111 is also formed in a cylindrical shape. Further, the gasifier wall 111 is coupled to the inner surface of the pressure vessel 110 by a support member (not illustrated).

The gasifier wall 111 separates the inside of the pressure vessel 110 into an internal space and an external space. The gasifier wall 111 is shaped such that the transverse sectional shape changes at the diffuser section 117 between the combustor section 116 and the reductor section 118, which will be described later. The gasifier wall 111 is configured such that the upper end on the perpendicularly upper side is connected to the gas discharge port 121 of the pressure vessel 110 and the lower end on the perpendicularly lower side is provided apart from the bottom of the pressure vessel 110 with spacing. Further, cooling water is stored in the slag bath 122 formed at the bottom of the pressure vessel 110, and immersion of the lower end of the gasifier wall 111 in the cooling water seals the inside and the outside of the gasifier wall 111 from each other. Burners 126 and 127 are inserted in the gasifier wall 111, and the syngas cooler 102 is arranged in the internal space. The structure of the gasifier wall 111 will be described later.

The annulus section 115 is a space formed between the inside of the pressure vessel 110 and the outside of the gasifier wall 111, that is, the external space and is fed with nitrogen, which is an inert gas separated by the air separation unit 42, through a nitrogen feed line (not illustrated). Thus, the annulus section 115 is a space filled with nitrogen. An in-furnace pressure equalizer tube (not illustrated) for equalizing the pressure inside the gasifier 101 is provided near the upper part in the perpendicular direction of the annulus section 115. The in-furnace pressure equalizer tube is provided to communicate between the inside and the outside of the gasifier wall 111 and caused to have substantially an even pressure so that the pressure difference between the inside (the combustor section 116, the diffuser section 117, and the reductor section 118) and the outside (the annulus section 115) of the gasifier wall 111 is within a predetermined pressure.

The combustor section 116 is a space used for partially combusting pulverized coal and char with air, and a combustion device formed of the plurality of burners 126 is arranged in the gasifier wall 111 in the combustor section 116. A high temperature combustion gas resulted from partial combustion of the pulverized coal and the char in the combustor section 116 passes through the diffuser section 117 and flows into the reductor section 118.

The reductor section 118 is a space in which a high temperature required for a gasification reaction is maintained, pulverized coal is fed in the combustion gas from the combustor section 116 and partially combusted, and the pulverized coal is decomposed into volatile components (carbon oxide, hydrogen, lower hydrocarbon, or the like) and gasified to generate a raw syngas, and a combustion device formed of the plurality of burners 127 are arranged in the gasifier wall 111 in the reductor section 118.

The syngas cooler 102 is provided inside the gasifier wall 111 and provided on the upper side in the perpendicular direction of the burners 127 of the reductor section 118. The syngas cooler 102 is a heat exchanger in which an evaporator 131, a superheater 132, and an economizer 134 are arranged in this order from the lower side in the perpendicular direction (the upstream side of the flow direction of the raw syngas) of the gasifier wall 111. The syngas cooler 102 cools the raw syngas by exchanging heat with the raw syngas generated in the reductor section 118. Each quantity of the evaporator 131, the superheater 132, and the economizer 134 is not limited to that illustrated in the drawing.

The operation of the gasifier unit 14 described above will now be described.

In the gasifier 101 of the gasifier unit 14, nitrogen and pulverized coal are feeded and ignited by the burners 127 of the reductor section 118, and pulverized coal, char, and compressed air (oxygen) are feeded and ignited by the burners 126 of the combustor section 116. In response, a high temperature combustion gas occurs in the combustor section 116 due to combustion of the pulverized coal and the char. In the combustor section 116, melted slag is generated in the high temperature gas due to the combustion of the pulverized coal and the char, and this melted slag attaches to the gasifier wall 111, drops to the furnace bottom, and is finally discharged to the cooling water in the slag bath 122.

The high temperature combustion gas generated in the combustor section 116 then passes through the diffuser section 117 and rises to the reductor section 118. In the reductor section 118, a high temperature state required for a gasification reaction is maintained, pulverized coal is mixed to the high temperature combustion gas, the pulverized coal is partially combusted under a high temperature reduction atmosphere to cause a gasification reaction, and a raw syngas is generated. The gasified raw syngas flows through from the lower side to the upper side in the perpendicular direction.

{Slag Crusher}

Next, a configuration of a slag crusher 200 according to the present embodiment will be described.

The slag crusher 200 is a device that crushes slag resulted after melted slag, which has dropped from the combustor section 116, is solidified by cooling water stored in the slag bath 122.

As illustrated in FIG. 2, the slag crusher 200 is provided perpendicularly below a slag hole 116A under the combustor section 116 and in the cooling water stored in the slag bath 122.

Figure 3:
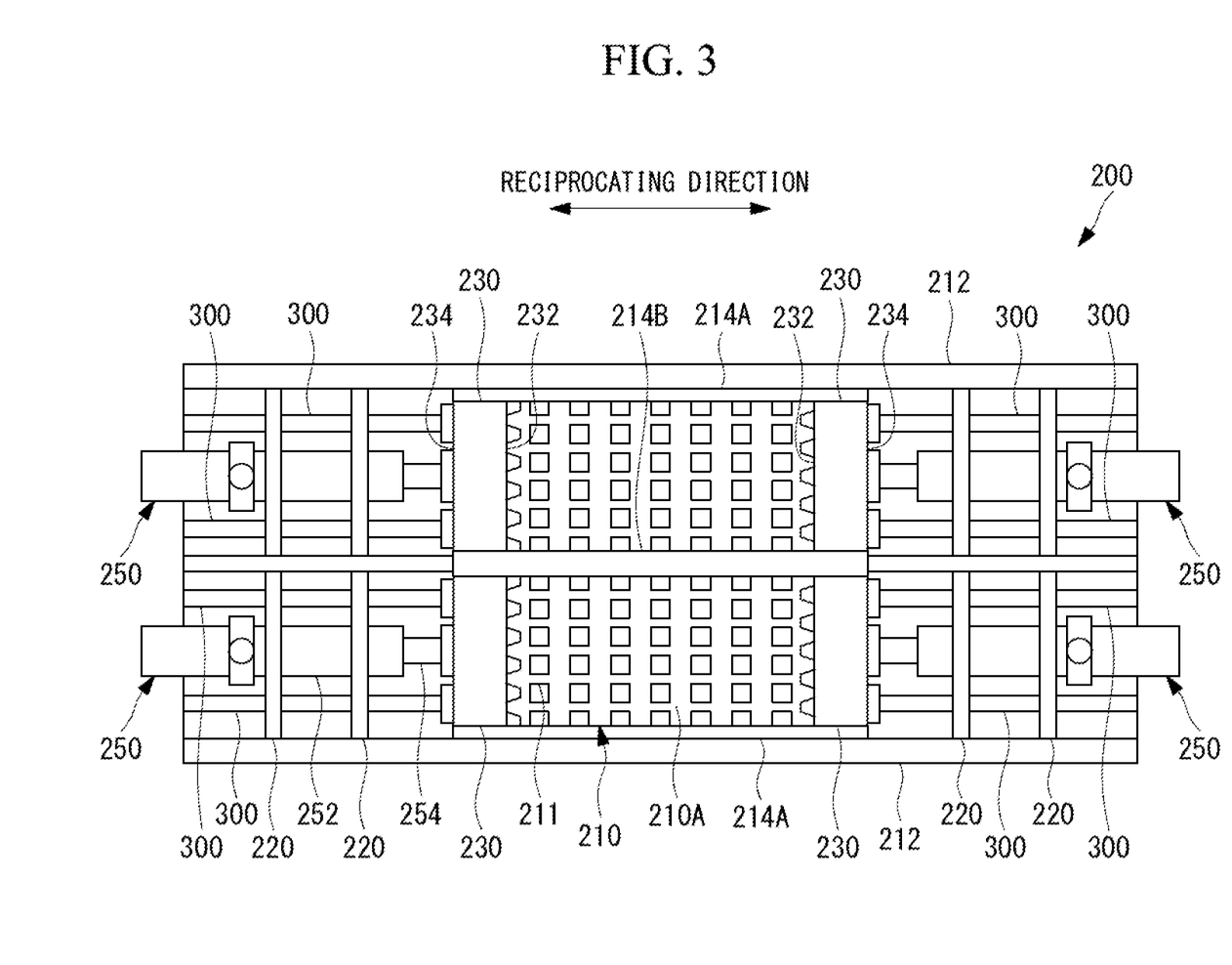
FIG. 3 is a plan view of a slag crusher according to one embodiment of the present invention.
Figure 4:
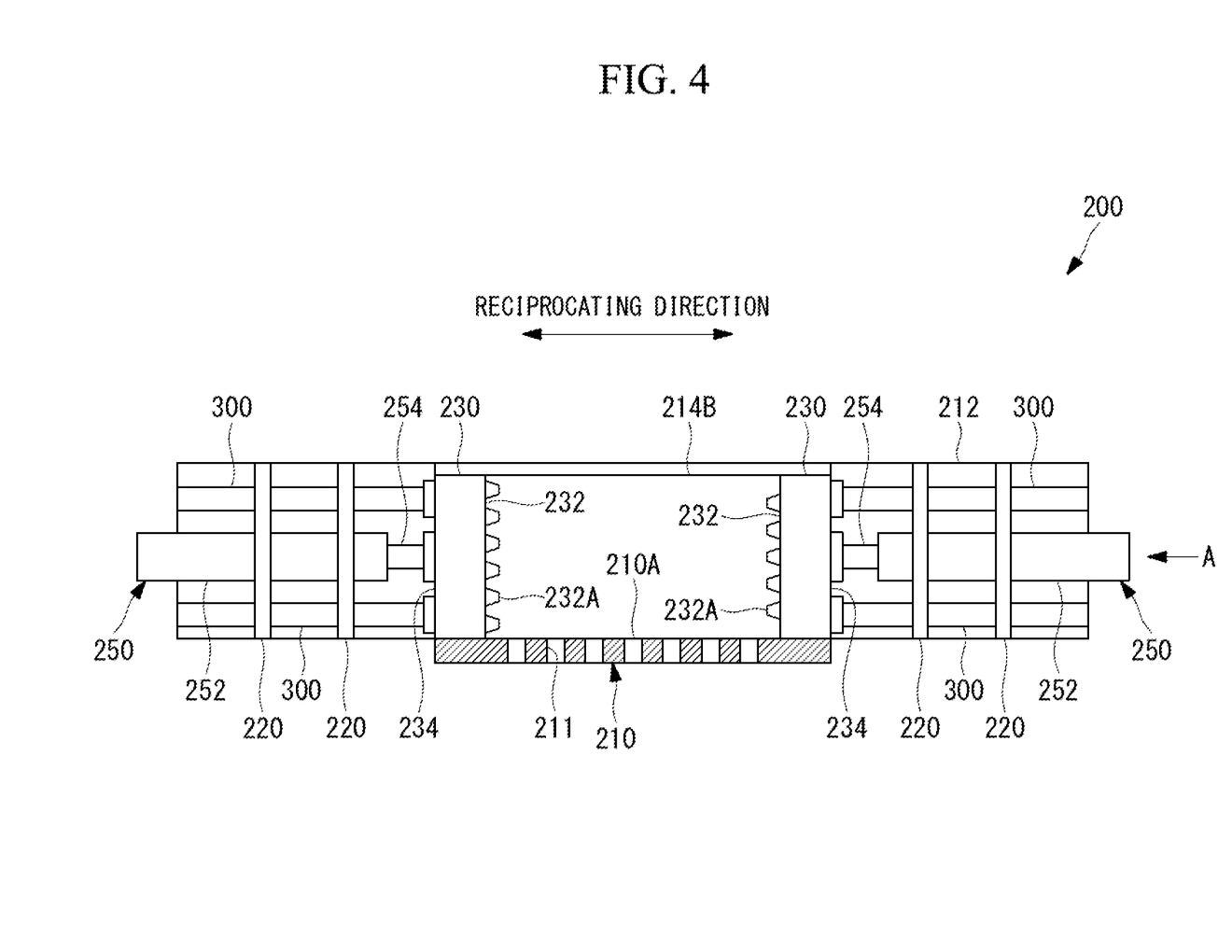
FIG. 4 is a vertical sectional view of the slag crusher according to one embodiment of the present invention.

As illustrated in FIG. 3 and FIG. 4, the slag crusher 200 has a screen 210 on which slag having a predetermined particle diameter or larger is accumulated, spreaders 230 that are reciprocated in a predetermined direction (reciprocating direction) by drive mechanisms 250 and interpose and cruse the slag accumulated on the screen 210, and guide rods 300 that restrict the moving direction of the spreaders 230.

The screen 210 is formed of a plate-like member, for example, and provided in a direction substantially orthogonal to the dropping direction of slag (for example, the horizontal direction) (see FIG. 2). A plurality of opening portions 211 are formed in the screen 210, slag having a smaller particle diameter than the opening portion 211 passes through the screen 210, and slag having a larger particle diameter than the opening portion 211 is accumulated on the top surface (collecting surface 210A) on the perpendicularly upper side of the screen 210.

The shape of the opening portion 211 is not particularly limited and may be, for example, a polygonal or a circle.

Side walls 212 standing in the perpendicular direction and extending in the reciprocating direction as illustrated in FIG. 4 are provided on the outer edge sides (on the outer edge sides located in the upper part and the lower part in the drawing sheet in the case of FIG. 3) of the screen 210 in a direction orthogonal to the reciprocating direction in a planar view as illustrated in FIG. 3.

The side walls 212 are a part of a component forming a frame of the slag crusher 200.

The spreader 230 is a member reciprocated perpendicularly above the collecting surface 210A by the drive mechanism 250.

As illustrated in FIG. 3 and FIG. 4, each spreader 230 is substantially a rectangular parallelepiped made of a metal, and a crushing surface 232 used for collapsing and crushing slag is formed on the front surface facing the forward direction.

Two spreaders 230 are provided facing each other such that respective crushing surfaces 232 face each other in the reciprocating direction.

In the case of FIG. 3, the two spreaders 230 facing each other in the reciprocating direction form a set, and two sets are provided side by side in a direction orthogonal to the reciprocating direction.

The number of sets of the spreaders 230 may be one or three or greater.

The two spreaders 230 facing each other in the reciprocating direction move in directions so as to come close to each other, thereby interpose slag accumulated on the collecting surface 210A between the crushing surfaces 232, and crush the slag into a smaller size of pieces that can pass through the opening portions 211.

In this case, protrusions 232A may be formed on the crushing surfaces 232, and in such a case, crushing of slag is facilitated by the protrusions 232A.

FIG. 3 and FIG. 4 are diagrams illustrating the spreaders 230 in a standby position before crushing slag.

Each spreader 230 reciprocates in a space surrounded by the two side walls 212. In this case, a side guide 214A along the inner wall of each side wall 212 may be provided between the side wall 212 and the spreader 230.

A center guide 214B along the reciprocating direction may be provided between adjacent sets of spreaders 230.

The side guide 214A and the center guide 214B have a predetermined height in the perpendicular direction, which is substantially the same as the height of the spreaders 230, for example. The side guides 214A and the center guide 214B restrict the moving direction of the spreaders 230 so that the entire spreaders 230 do not fluctuate in a direction crossing the reciprocating direction.

The side guides 214A and the center guide 214B suppress fluctuations due to the reciprocating movement of the spreaders 230 and thereby can stabilize the movement of the spreaders 230.

For example, each drive mechanism 250 is formed of a telescopic actuator (for example, a hydraulic cylinder) having a housing 252 fixed to a frame (not illustrated) of the slag crusher 200 and a rod 254 driven to reciprocate in the reciprocating direction with respect to the housing 252.

Figure 5:
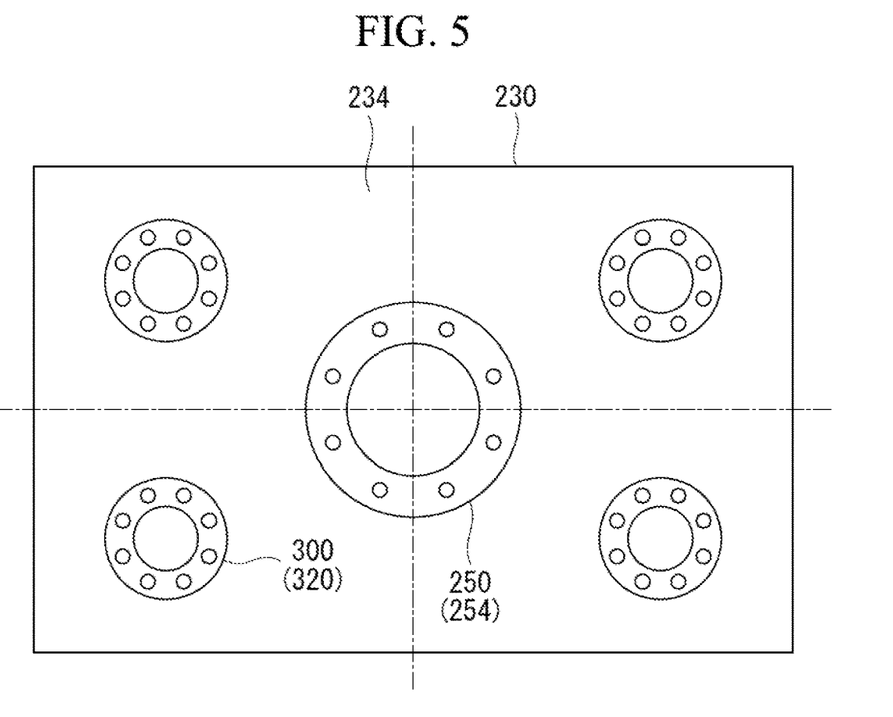
FIG. 5 is a diagram illustrating a connection surface of a spreader when viewed from the arrow A illustrated in FIG. 4.

As illustrated in FIG. 3 to FIG. 5, one end of the rod 254 is connected to a connection surface 234 that is a back face of the crushing surface 232. Accordingly, the spreader 230 is reciprocated along the reciprocating direction in response to telescopic movement of the drive mechanism 250 (reciprocation drive of the rod 254).

In the case of FIG. 3 to FIG. 5, one drive mechanism 250 (one rod 254) is connected to one spreader 230.

In stabilizing the reciprocating movement of the spreaders 230, the guide rods 300 serve as members that efficiently receive an offset load due to fluctuations of the spreaders 230 or the like occurring during movement of the spreaders 230 in the reciprocating direction.

The guide rod 300 is a bar-like member that more accurately guides the movement of the spreader 230 in the reciprocating direction and has an axis line X along the reciprocating direction.

The guide rod 300 is connected to the connection surface 234 corresponding to the back face of the crushing surface 232 in the same manner as the drive mechanism 250.

In the case of FIG. 3 to FIG. 5, four guide rods 300 are connected to one spreader 230. The number of guide rods 300 may be three or less or may be five or greater, and the guide rods 300 are preferably arranged so as to exhibit required functions with good balance.

As illustrated in FIG. 5, when the connection surface 234 is viewed from the reciprocating direction of the spreader 230, it is preferable that the connection positions of the guide rods 300 be located symmetrically with respect to the connection position of the drive mechanism 250, and it is therefore preferable that the number of guide rods 300 be four or greater per the drive mechanism 250 in a typical arrangement of the guide rods 300.

The guide rods 300 are supported by a casing 220 so as to be slidable in the reciprocating direction and so that fluctuations in a direction orthogonal to the reciprocating direction are restricted.

The casing 220 is fixed to a frame (for example, the side wall 212) of the slag crusher 200.

Figure 6:
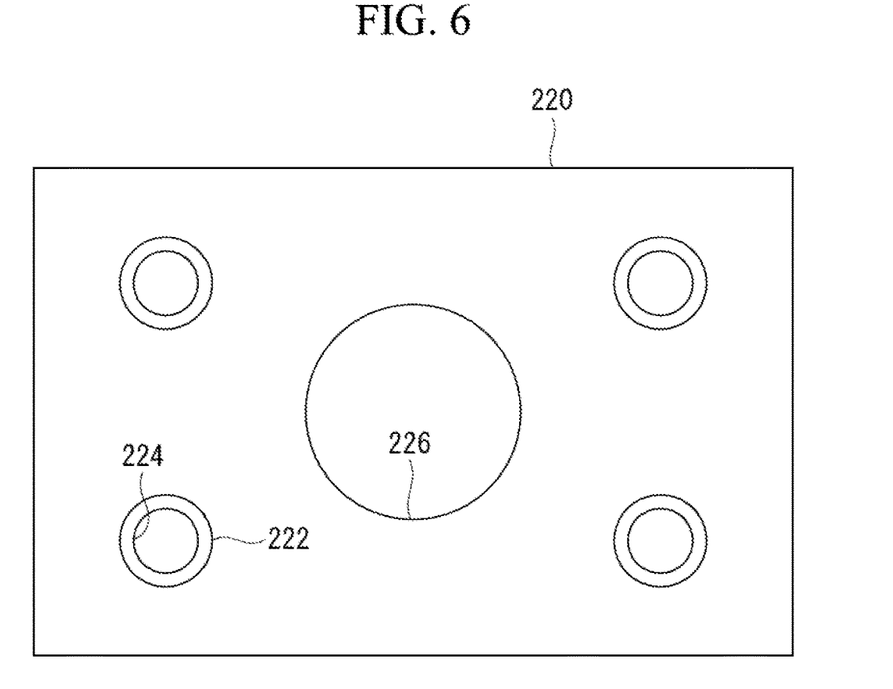
FIG. 6 is a diagram illustrating a casing when viewed from the arrow A illustrated in FIG. 4.

As illustrated in FIG. 6, the casing 220 is a rectangular plate-like member when viewed from the reciprocating direction (viewed from the arrow A in FIG. 4). A through hole 226 through which the drive mechanism 250 penetrates is formed at substantially the center of the casing 220. A plurality of (four in FIG. 6) bearing members 222 each formed with a slide hole 224 are provided around the through hole 226 formed in the casing 220. In this case, the number of bearing members 222 corresponds to the number of guide rods 300.

The bearing member 222 supports the guide rod 300 in a slidable manner while restricting the moving direction of the guide rod 300 by the slide hole 224. Thus, the moving direction of the guide rod 300, that is, the moving direction of the spreader 230 to which the guide rod 300 is connected can be more accurately restricted. Accordingly, for example, fluctuations of the spreader 230 in a direction orthogonal to the reciprocating direction can be restricted.

The bearing member 222 is used for smoothing the sliding of the guide rod 300 and may be made of a copper-based material (for example CAC403), for example.

As illustrated in FIG. 5, when the connection surface 234 is viewed from the reciprocating direction (viewed from the arrow A in FIG. 4), the connection position between the drive mechanism 250 and the connection surface 234 is located at substantially the center relative to the rectangular connection surface 234.

On the other hand, the connection positions between the guide rods 300 and the connection surface 234 are located in a circumferentially symmetrical manner with respect to the connection position between the drive mechanism 250 and the connection surface 234. Specifically, the connection positions between the four guide rods 300 and the connection surface 234 are located symmetrically with respect to a vertical line and a horizontal line passing through the center of the connection surface 234 illustrated in FIG. 5 (that is, the center of the connection position between the drive mechanism 250 and the connection surface 234).

Next, details of the guide rod 300 will be described.

Figure 7:
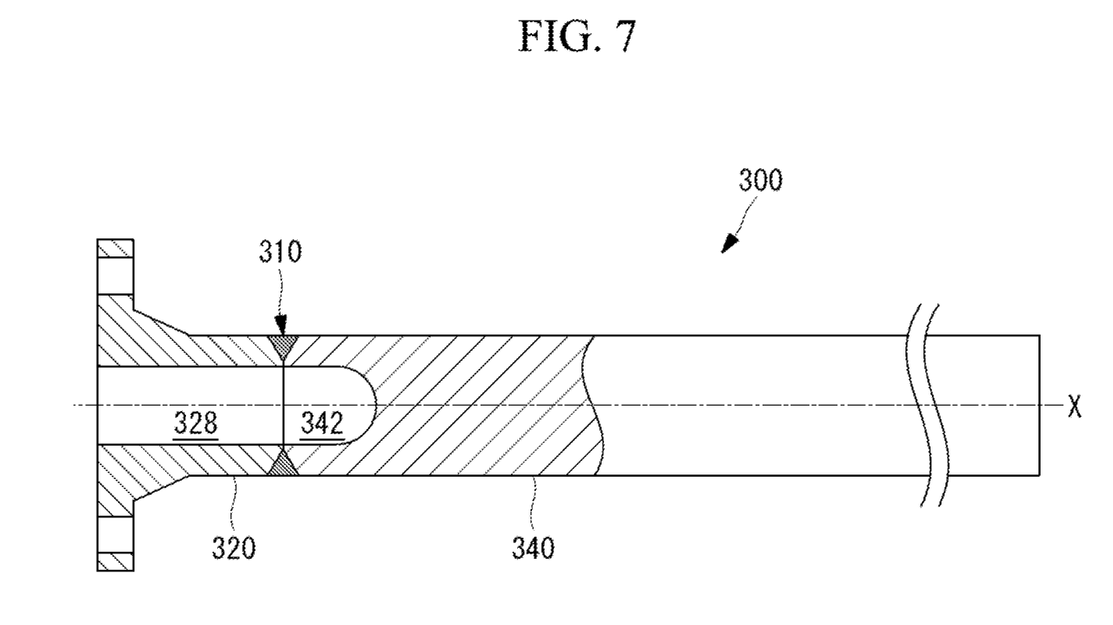
FIG. 7 is a partial vertical sectional view of a guide rod provided in the slag crusher according to one embodiment of the present invention.

As illustrated in FIG. 7, the guide rod 300 is a bar-like member formed of two integrated members (a spreader-side member 320 and a shaft member 340) welded and connected at a butt portion 310 in the axis line X direction.

Figure 8:
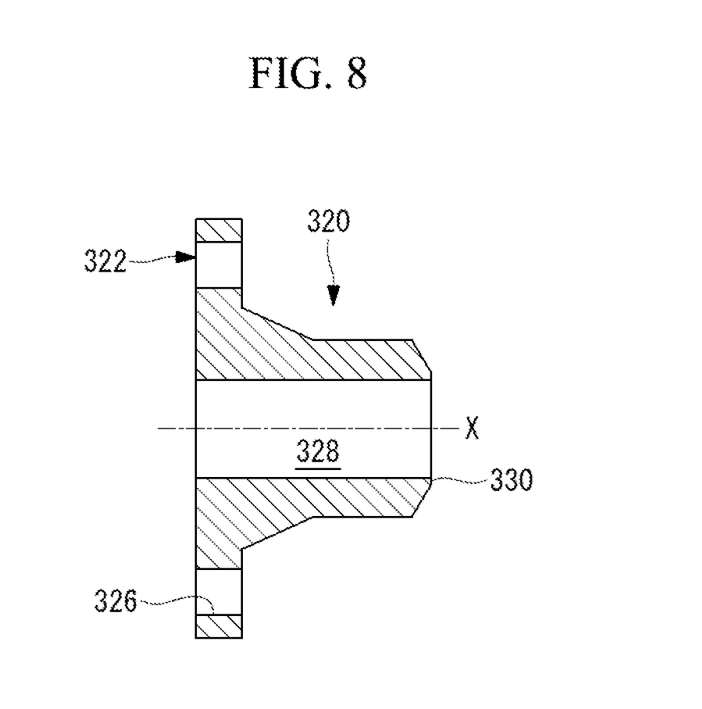
FIG. 8 is a vertical sectional view of a spreader-side member of the guide rod.

As illustrated in FIG. 8, the spreader-side member 320 is formed of a flange-shaped member in which a flange portion 322 is formed on one end side (on the left end side in the drawing sheet illustrated in FIG. 8) connected to the connection surface 234 of the spreader 230.

A bolt hole 326 is formed in the flange portion 322, and the spreader-side member 320 (guide rod 300) is fixed to the connection surface 234 by bolt tightening.

On the other hand, a spreader-side butt surface 330 butted against a shaft-side butt surface 344 (described later) of the shaft member 340 is formed on the other end side (on the right end side in the drawing sheet illustrated in FIG. 8) of the spreader-side member 320.

The spreader-side member 320 has a hollow space from the flange portion 322 to the spreader-side butt surface 330 along the axis line X direction, and a hollow-shaped spreader-side hollow portion 328 penetrating along the axis line X direction is formed.

Figure 9:
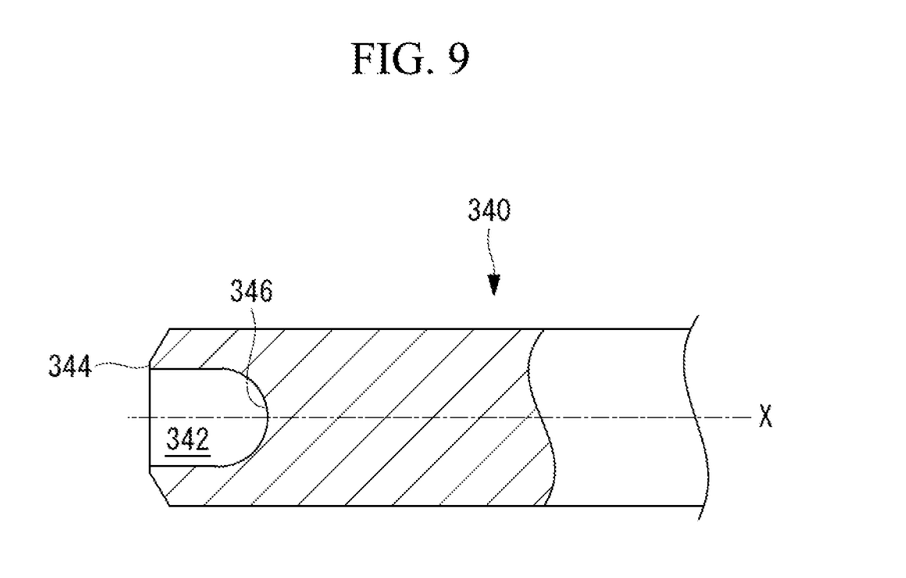
FIG. 9 is a partial vertical sectional view of a shaft member of the guide rod.

As illustrated in FIG. 9, the shaft member 340 is a bar-like member in which a shaft-side butt surface 344 butted against the spreader-side butt surface 330 is formed on one end side (on the left end side in the drawing sheet illustrated in FIG. 8).

In the shaft member 340, a shaft-side hollow portion 342 having a hollow space extending by a predetermined distance along the axis line X direction from the shaft-side butt surface 344 is formed. In other words, the shaft member 340 is a bar-like member in which a part on the shaft-side butt surface 344 side is formed of a shaft-side hollow portion 342 that is a hollow space, and the remaining portion is formed of a solid bar-like member that is a solid portion.

The "predetermined distance" as used herein is around 1/20 to 1/10 of the length along the axis line X direction of the shaft member 340, for example.

It is preferable that a boundary 346 between the shaft-side hollow portion 342 and the solid portion of the shaft member 340 adjacent to the shaft-side hollow portion 342 be shaped in a smooth curved shape having an R part around the corner.

With such a curved shape, it is possible to suppress a stress from concentrating around the corner of the boundary 346 and relieve concentration of the stress to improve the strength of the guide rod 300.

As illustrated in FIG. 7, the spreader-side butt surface 330 of the spreader-side member 320 and the shaft-side butt surface 344 of the shaft member 340 are butted against each other in the axis line X direction, and thereby a butt portion 310 (connection portion) is formed.

In the butt portion 310, the spreader-side member 320 and the shaft member 340 have substantially the same outer diameter, which is larger than or equal to around 80 mm and smaller than or equal to around 100 mm, for example. The spreader-side hollow portion 328 and the shaft-side hollow portion 342 have substantially the same inner diameter, which is greater than or equal to around 30% and smaller than or equal to around 40% of the outer diameter of the spreader-side member 320 and the shaft member 340. That is, at the butt portion 310, the spreader-side member 320 and the shaft member 340 have the same shape of the cross section orthogonal to the axis line X direction.

For example, a V-shape groove may be formed in the butt portion 310. In such a case, the V-shape groove is formed in the entire circumference around the axis line of the guide rod 300.

By providing such a groove, it is possible to ensure the weld leg length and improve the welding strength. In the butt weld of the butt portion 310, since the thickness of the butt portion 310 is controlled to be the same, it is possible to improve the welding strength by ensuring penetration of welding.

With welding being applied to the entire circumference of the butt portion 310, the spreader-side member 320 and the shaft member 340 are connected to each other to form one guide rod 300 in which the spreader-side member 320 and the shaft member 340 are integrated in the axis line X direction of the guide rod 300.

The present embodiment exhibits the following advantageous effects.

Since the spreader-side member 320 and the shaft member 340 are butted against each other and welded (butt welding), a discontinuous shape portion (for example, a step portion caused by a difference in outer diameters) does not occur at the butt portion 310 between the spreader-side member 320 and the shaft member 340, which can suppress concentration of a stress.

It is possible to reduce the weight of the spreader-side member 320 and the shaft member 340 compared to a case where the spreader-side member 320 and the shaft member 340 are solid. Furthermore, since the guide rod 300 has flexible structure due to the hollow structure, it is possible to suppress a stress from concentrating in the connection portion between the spreader-side member 320 and the spreader 230. Furthermore, in the butt welding of the butt portion 310, since the thickness of the butt portion is controlled to be the same, it is possible to improve the welding strength by ensuring penetration of welding.

The guide rod 300 can accurately guide the movement of the spreader 230 in the reciprocating direction. Furthermore, since the bearing member 222 is provided in the slide hole 224 formed in the casing 220 and supported so as to restrict the moving direction in which the guide rod 300 passes, it is possible to more accurately restrict the moving direction of the guide rod 300, that is, the moving direction of the spreader 230 to which the guide rod 300 is connected.

The connection position between the connection surface 234 and the guide rod 300 when viewed from the reciprocating direction is arranged in a circumferentially symmetrical manner with respect to the connection position between the connection surface 234 and the drive mechanism 250. This enables the guide rod 300 to efficiently receive an offset load generated by fluctuations of the spreader 230 occurring during reciprocation of the spreader 230. Thus, the reciprocating movement of the spreader 230 can be stabilized.

Modified Example

Figure 10:
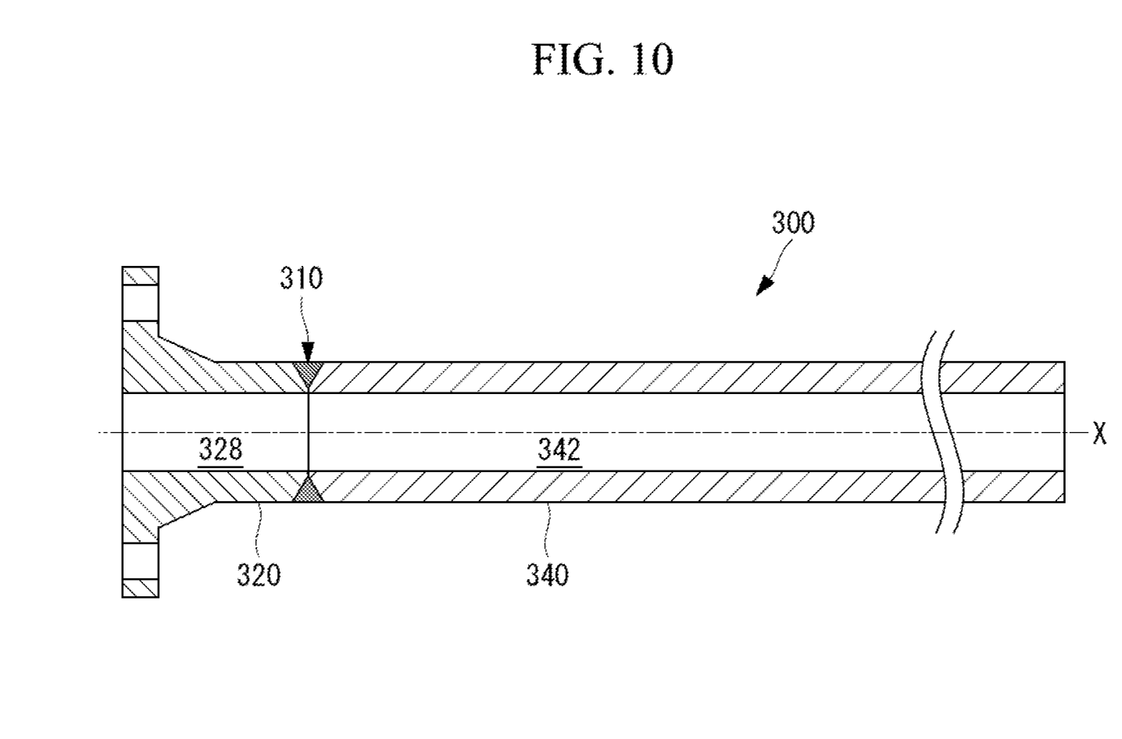
FIG. 10 is a partial vertical sectional view according to a modified example of a guide rod.

As with the guide rod 300 illustrated in FIG. 10, the shaft-side hollow portion 342 formed in the shaft member 340 may be formed along the axis line X direction and over the entire length. That is, the shaft-side hollow portion 342 hollowed by penetration along the axis line X direction is formed in the shaft member 340.

In such a case, the weight of the shaft member 340 can be further reduced compared to a case where a part of the shaft member 340 is solid. Since the guide rod 300 has flexible structure because of the entirely hollowed structure, it is possible to suppress a stress from concentrating in the connection portion between the spreader-side member 320 and the spreader 230 to improve the strength of the guide rod 300.

Figure 11:
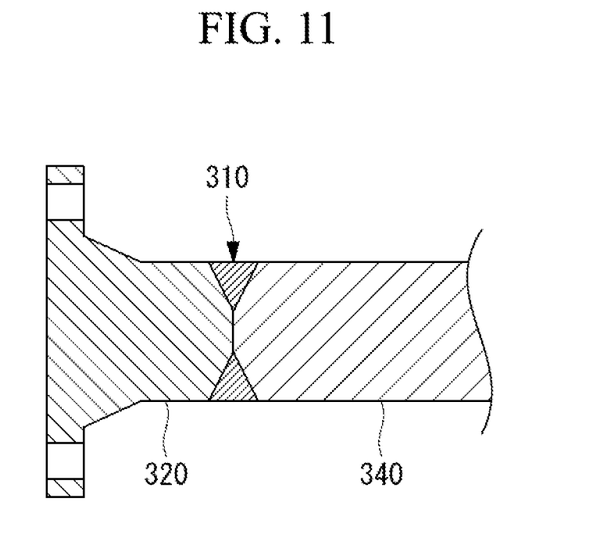
FIG. 11 is a partial vertical sectional view according to another modified example of a guide rod.

Although the forms in which at least a part of the guide rod 300 is hollowed as illustrated in FIG. 7 and FIG. 10 have been described as an example in the description so far, the guide rod 300 may be formed by butt-welding the solid spreader-side member 320 and the solid shaft member 340 together as illustrated in FIG. 11.

In this case, a groove may be formed by the spreader-side butt surface 330 and the shaft-side butt surface 344 such that welding penetration can come close to the center of the shaft member 340 in an X-shape at the butt portion 310. By providing such a groove, it is possible to ensure a weld leg length to improve the welding strength.

REFERENCE SIGNS LIST

- 10 integrated coal gasification combined cycle (integrated gasification combined cycle)
- 11 coal feeding unit
- 11a coal feed line
- 14 gasifier unit
- 15 char recovery unit
- 16 gas clean-up unit
- 17 gas turbine
- 18 steam turbine
- 19 generator
- 20 heat recovery steam generator
- 41 compressed air feed line
- 42 air separation unit
- 43 first nitrogen feed line
- 45 second nitrogen feed line
- 46 char return line
- 47 oxygen feed line
- 49 raw syngas line
- 51 dust collecting unit
- 52 feed hopper
- 53 gas discharge line
- 61 compressor
- 62 combustor
- 63 turbine
- 64 rotary shaft
- 65 compressed air feed line
- 66 fuel gas feed line
- 67 combustion gas feed line
- 68 gas booster
- 69 turbine
- 70 flue gas line
- 71 steam feed line
- 72 steam recovery line
- 74 gas purificating unit
- 75 stack
- 101 gasifier
- 102 syngas cooler
- 110 pressure vessel
- 111 gasifier wall
- 115 annulus section
- 116 combustor section
- 116A slag hole
- 117 diffuser section
- 118 reductor section
- 121 gas discharge outlet
- 122 slag bath
- 126 burner
- 127 burner
- 200 slag crusher
- 210 screen
- 210A collecting surface
- 211 opening portion
- 212 side wall
- 214A side guide
- 214B center guide
- 220 casing
- 222 bearing member
- 224 slide hole
- 226 through hole
- 230 spreader
- 232 crushing surface
- 234 connection surface
- 250 drive mechanism
- 252 housing
- 254 rod
- 300 guide rod
- 310 butt portion
- 320 spreader-side member
- 322 flange portion
- 326 bolt hole
- 328 spreader-side hollow portion
- 330 spreader-side butt surface
- 340 shaft member
- 342 shaft-side hollow portion
- 344 shaft-side butt surface
- 346 boundary
- X axis line

The invention claimed is:

1. A slag crusher that crushes slag generated by a combustor of a gasifier that gasifies carbonaceous feedstock and solidified in cooling water stored in a slag bath installed perpendicularly below the combustor, the slag crusher comprising:
   a screen of a porous member provided so as to cross a drop direction of the slag and formed with a plurality of opening portions;
   a spreader that is reciprocated in a predetermined direction along a top surface on a perpendicularly upper side of the screen and crushes the slag accumulated on the screen; and
   a guide rod that is a bar-like member having an axis line along the predetermined direction, is connected to the spreader, and restricts a moving direction of the spreader,
   wherein the guide rod has a spreader-side member connected to the spreader and a shaft member connected to the spreader-side member,
   wherein the spreader-side member and the shaft member are connected by butt welding in the axis line direction,
   wherein the spreader-side member and the shaft member have the same shape of cross sections orthogonal to the axis line direction at a butt welding position,
   wherein the spreader-side member has a spreader-side hollow portion formed along the axis line direction,
   wherein the shaft member has a shaft-side hollow portion formed along the axis line direction, and
   wherein the shaft-side hollow portion is formed only in a part of the shaft member adjacent to the spreader-side member.

2. The slag crusher according to claim 1, wherein in the shaft member, a boundary between the shaft-side hollow portion and a solid portion adjacent to the shaft-side hollow portion is shaped in a smooth curve.

3. The slag crusher according to claim 1 further comprising a drive mechanism connected to the spreader and configured to reciprocate the spreader in the predetermined direction,
   wherein the guide rod comprises at least four guide rods, and
   wherein connection positions of the guide rods to the spreader when viewed from the predetermined direction are located in a circumferentially symmetrical manner with respect to a connection position of the drive mechanism to the spreader.

4. The slag crusher according to claim 1 further comprising a casing in which a through hole in which the guide rod is slidably supported is formed.

5. The gasifier comprising the slag crusher according to claim 1.

6. An integrated gasification combined cycle comprising:
the gasifier according to claim 5;
a gas turbine rotated and driven by at least partial combustion of a raw syngas generated by the gasifier;
a steam turbine rotated and driven by steam generated by a heat recovery steam generator that introduces a turbine flue gas discharged from the gas turbine; and
a generator coupled to and rotated by the gas turbine and/or the steam turbine.

7. An assembly method of a slag crusher that, by using a spreader reciprocated in a predetermined direction, crushes slag generated by a combustor of a gasifier that gasifies carbonaceous feedstock and solidified in cooling water stored in a slag bath installed perpendicularly below the combustor, at a guide rod that is a bar-like member having an axis line along the predetermined direction, has a spreader-side member connected to the spreader and a shaft member connected to the spreader-side member, and restricts a moving direction of the spreader, the spreader-side member having a spreader-side hollow portion formed along the axis line direction, the shaft member having a shaft-side hollow portion formed along the axis line direction, and the shaft-side hollow portion being formed only in a part of the shaft member adjacent to the spreader-side member, the assembly method comprising a step of:

performing butt welding in the axis line direction on the spreader-side member and the shaft member at a portion where the spreader-side member and the shaft member have the same shape of cross sections orthogonal to the axis line direction.

* * * * *